(12) United States Patent
Dorn et al.

(10) Patent No.: US 12,030,423 B2
(45) Date of Patent: Jul. 9, 2024

(54) VEHICLE HAVING A LIVING SPACE EXTENSION

(71) Applicant: Erwin Hymer Group SE, Bad Waldsee (DE)

(72) Inventors: Günter Dorn, Schlier (DE); Rainer Buck, Wangen (DE); Marcus Metzler, Bad Waldsee (DE)

(73) Assignee: Erwin Hymer Group SE, Bad Waldsee (DE)

( * ) Notice: Subject to any disclaimer, the term of this patent is extended or adjusted under 35 U.S.C. 154(b) by 602 days.

(21) Appl. No.: 17/046,043

(22) PCT Filed: Apr. 9, 2019

(86) PCT No.: PCT/EP2019/058974
§ 371 (c)(1),
(2) Date: Oct. 8, 2020

(87) PCT Pub. No.: WO2019/197412
PCT Pub. Date: Oct. 17, 2019

(65) Prior Publication Data
US 2021/0031669 A1     Feb. 4, 2021

(30) Foreign Application Priority Data

Apr. 9, 2018   (DE) ..................... 10 2018 108 385.8
May 16, 2018  (DE) ..................... 10 2018 111 743.4

(51) Int. Cl.
*B60P 3/34*      (2006.01)
*B62D 29/04*     (2006.01)

(52) U.S. Cl.
CPC ................. *B60P 3/34* (2013.01); *B60P 3/341* (2013.01); *B62D 29/043* (2013.01)

(58) Field of Classification Search
CPC .................................. B60P 3/34; B60P 3/341
(Continued)

(56) References Cited

U.S. PATENT DOCUMENTS

| | | |
|---|---|---|
| 2,820,666 A | 1/1958 | Grochmal |
| 3,802,732 A | 4/1974 | McKee |

(Continued)

FOREIGN PATENT DOCUMENTS

| | | |
|---|---|---|
| AU | 2008258189 A1 | 7/2009 |
| CH | 663584 A5 | 12/1987 |

(Continued)

OTHER PUBLICATIONS

English translation of FR 2554062 (Year: 1985).*

*Primary Examiner* — Joseph D. Pape
(74) *Attorney, Agent, or Firm* — Dinsmore & Shohl LLP (57) ABSTRACT

A vehicle, such as a motor home or camper or the like, includes a living space expansion that can be set up as needed and has a space volume, which, in the set-up state, is connected with an interior space volume of the vehicle. The living space expansion includes at least three wall sections, wherein at least two of the wall sections are each configured as side walls, wherein at least of the one wall sections is configured to be moved out of the interior space volume to form the living space expansion. At least one of the wall sections of the living space expansion can be a hollow chamber wall section. The hollow chamber wall section can be an inflatable hollow chamber wall section or a self-inflating hollow chamber wall section.

20 Claims, 5 Drawing Sheets

(58) Field of Classification Search
USPC .................................... 296/173, 165, 26.12
See application file for complete search history.

(56) References Cited

U.S. PATENT DOCUMENTS

| | | | |
|---|---|---|---|
| 4,101,062 A | | 7/1978 | Lazar |
| 4,955,661 A | | 9/1990 | Mattice |
| 5,570,924 A | * | 11/1996 | Few .......................... B60P 3/34 |
| | | | 296/171 |
| 5,951,082 A | * | 9/1999 | DiBiagio ................ B60R 15/00 |
| | | | 296/156 |
| 6,098,346 A | * | 8/2000 | Miller ....................... B60P 3/36 |
| | | | 296/22 |
| 6,325,447 B1 | * | 12/2001 | Kuo ......................... B60P 3/341 |
| | | | 296/99.1 |
| 6,735,909 B1 | | 5/2004 | Gardner |
| 7,234,747 B2 | * | 6/2007 | Rasmussen ............... B60P 3/34 |
| | | | 296/165 |
| 8,141,927 B2 | * | 3/2012 | Kreil ........................ B60P 3/34 |
| | | | 296/165 |
| 9,873,467 B2 | | 1/2018 | Wall, II |
| 10,029,745 B2 | | 7/2018 | Wall, II |
| 2008/0217946 A1 | * | 9/2008 | Kobrehel ................ B60P 3/34 |
| | | | 296/26.13 |
| 2016/0347230 A1 | | 12/2016 | Pellicer |
| 2018/0079348 A1 | * | 3/2018 | Ronsen .................... B60P 3/34 |

FOREIGN PATENT DOCUMENTS

| | | | |
|---|---|---|---|
| DE | 8308260 | U1 | 12/1983 |
| DE | 8416255 | U1 | 9/1984 |
| DE | 10355763 | A1 | 6/2005 |
| EP | 2093103 | A1 | 8/2009 |
| FR | 2554062 | A1 | 5/1985 |
| FR | 2617449 | * | 1/1989 |
| KR | 1020140069665 | A | 6/2014 |
| WO | 2017035068 | A1 | 3/2017 |

\* cited by examiner

VEHICLE HAVING A LIVING SPACE EXTENSION

CROSS-REFERENCE TO RELATED APPLICATIONS

This application is the United States national phase of International Application No. PCT/EP2019/058974 filed Apr. 9, 2019, and claims priority to German Patent Application Nos. 10 2018 108 385.8 filed Apr. 9, 2018 and 10 2018 111 743.4 filed May 16, 2018, the disclosures of which are hereby incorporated by reference in their entirety.

BACKGROUND OF THE INVENTION

Field of the Invention

The present invention relates to a vehicle, such as a motorhome or the like, having a living space extension.

Description of Related Art

From the state of the art, vehicles are known, in particular motor homes, campers or similar recreational vehicles, which comprise what is called a living space expansion. In this regard, such a living space expansion can be understood to have different embodiments; for example, known living space expansions are configured as a popup roof, using corresponding kinematics, or as alcoves or as a slide-out. A slide-out is understood to be a living space expansion that comprises rigid walls and a drive for movement by way of corresponding guide elements, for example a guide rod assembly.

A disadvantage of the living space expansions known from the state of the art, which connect to an interior space volume of the vehicle in the set-up state and thereby increase the size of this interior space volume, is sometimes that problems exist with seals. It is furthermore particularly problematic that the known designs are susceptible to problems due to the required mechanical components, for example a scissors linkage, guide rod assembly, etc., and furthermore have a great weight.

SUMMARY OF THE INVENTION

It is therefore the task of the invention to make available a vehicle that comprises a living space expansion that particularly saves weight.

Proceeding from a vehicle, in particular a motor home or camper or the like, comprising a living space expansion that can be set up as needed and has a space volume that is connected with an interior space volume of the vehicle in the set-up state, wherein the living space expansion comprises at least three wall sections, wherein at least two wall sections are configured as side walls, in each instance, wherein at least one wall section, preferably three wall sections are configured so that they can move out from the interior space volume to form the living space expansion, by means of at least one movement means, it is provided, according to the invention, that at least one wall section of the living space expansion is configured as a hollow chamber wall section, in particular as an inflatable hollow chamber wall section or as a self-inflating hollow chamber wall section.

Such a hollow chamber wall section or such hollow chamber wall sections has/have a low weight in comparison with rigid walls, so that a corresponding living space expansion can be made available with a reduced weight.

An advantage of hollow chamber wall sections, in particular inflatable or self-inflating hollow chamber wall sections, is their particularly simple set-up process, i.e., assembly or disassembly. It is furthermore advantageous, in this regard, that it is possible to do without complex mechanical components that might be required for assembly or disassembly. Therefore a living space expansion can be made available that can have longer periods of use due to reduced wear. Furthermore, it is advantageous that the hollow chamber wall sections are configured as supporting structures and thereby also make it possible to make a stable living space expansion available.

In the sense of the invention, a corner section of a side wall and/or a corner section of a wall section can also be configured as a hollow chamber wall section. Accordingly, it can be possible that a wall section that is free of hollow chambers or is configured as a rigid wall section can be arranged between hollow chamber wall sections.

Therefore, a rigid wall section can be understood, in the sense of the invention, to be a wall section that is configured free of hollow chambers or that does not comprise any hollow chambers.

In a particularly advantageous embodiment of the invention, it can be provided that at least one side wall, preferably both side walls, are configured as hollow chamber wall sections.

By making available a side wall that is configured as a hollow chamber wall section, it is possible to make available an overall side wall of the living space expansion with a low weight, and thereby assembly and disassembly of the living space expansion can be simplified. If both side walls of the living space expansion are each configured as hollow chamber wall sections, a correspondingly greater weight reduction of the living space expansion can be made possible, and correspondingly simplified installation and removal of the living space expansion can be achieved.

So as to be able to achieve further weight reductions of the living space extension and so as to further simplify assembly and disassembly of the living space extension, it can be provided, in a further advantageous embodiment of the invention, that all three wall sections are configured as hollow chamber wall sections. Herein, the terms "living space expansion" and "living space extension" may be used interchangeably.

A further advantageous embodiment of the invention can provide that at least one hollow chamber wall section comprises chambers, in particular air chambers, which are arranged essentially parallel to one another in a horizontal expanse and separated from one another. In this way, in particular when the living space expansion is set up, a particularly stable hollow chamber wall section can be obtained. Such air chambers can be filled with air in correspondingly simple and rapid manner, and thereby particularly simple and rapid assembly of the living space expansion can be made possible. The disassembly effort can be simplified accordingly. So as to obtain a particularly stable hollow chamber wall section in the set-up state, it can be provided, in an alternative, advantageous embodiment of the invention, that at least one hollow chamber wall section comprises chambers, in particular air chambers, which are arranged essentially parallel to one another in a vertical expanse and separated from one another. Such air chambers can be filled with air correspondingly easily and rapidly, and thereby particularly simple and rapid assembly of the living space expansion can be made possible. The disassembly effort can be simplified accordingly.

In a practical embodiment, it can be possible that between one and ten, preferably between two and eight chambers are formed. Such hollow chamber wall sections are optimized with regard to stability requirements and simplified assembly and disassembly effort.

In a particularly advantageous further development, the invention can provide that at least one chamber is connected with the vehicle and/or with an adjacent chamber by way of a connecting means, preferably a Keder connection. In this way, a particularly stable living space extension can be obtained.

So as to furthermore positively influence the stability of the living space extension, it can be provided, in a particularly advantageous embodiment of the invention, that the chambers are covered by a covering means, wherein the covering means comprises at least one connecting means, preferably a Keder connection, by means of which the covering means and the vehicle are connected.

In an advantageous embodiment of the invention, it can be provided that the living space extension comprises at least one additional rigid wall section. In this way, the stability of the living space extension in the set-up state can be positively influenced.

So as to be able to make available a particularly stable and strong living space extension, the invention can provide, in an advantageous further development, that at least one hollow chamber wall section is configured in at least multiple layers and comprises at least one layer composed of PVC and/or TPU.

In an advantageous further development, the invention can provide that at least one hollow chamber wall section is produced from a drop-stitch material. Such materials are very strong, and thereby the useful lifetime of the living space extension can be extended. Furthermore, particularly easy assembly and disassembly of the living space extension is made possible.

It is known that in the case of such drop-stitch constructions, the outsides and insides of the respective wall sections are interlinked with vertical connecting fibers, and therefore they can be kept in the desired shape even under great internal pressure. This results in a fabric that is very tear-resistant and stable in shape due to the great number of links, and withstands great stresses, in particular, but at the same time can be folded together in compact manner in the non-inflated state.

In an advantageous embodiment of the invention, it can be provided that the at least one movement means is configured as a motor-driven movement means. This can make simplified assembly and disassembly of the living space extension possible. Furthermore, living space extensions having an increased or enlarged volume can be made possible or available, and their mobility can be simplified using such a movement means.

So as to be able to make available a cost-advantageous and reliable movement means, it can be provided, in a further advantageous embodiment of the invention, that the at least one movement means is configured as a hydraulic movement means.

So as to be able to make available a cost-advantageous and reliable movement means in some other way, an advantageous embodiment of the invention can provide that the at least one movement means is configured as a mechanical movement means, preferably as a scissors mechanism.

So as to be able to make available a living space extension that is essentially arranged vertically, a further advantageous embodiment of the invention can provide that the living space expansion is arranged in a roof region of the vehicle.

In a further advantageous embodiment, it can also be possible that the living space expansion is arranged in a rear region of the vehicle. Such a living space expansion can be used, for example, in the case of vehicles in which a living space expansion on the side cannot be implemented.

In a further advantageous embodiment, the invention can furthermore provide that the living space expansion is configured as an alcove. In this way, a living space expansion for making sleeping space available, for example, can be created.

Therefore, the invention can provide a vehicle wherein the living space expansion is arranged in a roof region of the vehicle or in a rear region of the vehicle, or that the living space expansion is configured as an alcove.

Also, a vehicle can be provided that comprises multiple living space expansions, wherein these are arranged in a roof region of the vehicle and/or in a rear region of the vehicle and/or the living space expansion is arranged in a front region of the vehicle, in particular is configured as an alcove.

A particularly advantageous embodiment of the invention can provide that a hollow chamber wall section comprises a side door or a rear hatch of the vehicle, preferably is configured as a side door or as a rear hatch of the vehicle. Such a living space extension can therefore be configured in particularly stable manner and can demonstrate increased functionality. Although motor homes and campers are listed as vehicles, this should not be understood as a restriction of any kind. All kinds of land vehicles, for example passenger cars, can comprise the living space extension according to the invention, which is hereby also made an object of the application.

In a further development of the invention, it can be provided that the living space expansion comprises at least one double-wall hollow chamber wall section, wherein furthermore, at least one additional layer is comprised so as to delimit the hollow chamber wall sections, which is preferably arranged as an inner layer on an inside and/or as an outer layer on an outside of the living space expansion.

In this way, a delimitation of the living space expansion can be made available, while allowing additional stability.

A delimitation can be understood, in particular, to mean the definition of an internal volume, for example for delimiting the expansion of the hollow chamber wall sections when pressure is applied to them. Alternatively, or supplementally, the delimitation can also bring about a delimitation of the spatial expansion, in particular of the space expansion, in that the outer and/or inner layer prevents further expansion of the living space in the form of an expansion stop.

With regard to the above information, according to which it can be provided that at least one hollow chamber wall section is configured at least in multiple layers, it can be provided, within the scope of the invention, in particular, that at least one hollow chamber wall section is configured in three layers or four layers, independent of the material used.

A three-layer embodiment can comprise an additional layer on the inside or outside of the living space extension, independent of the material. In this regard, the additional layer can be configured as a delimitation layer or, alternatively or supplementally, can have further functionalities.

The invention can thereby provide a living space expansion that is formed by double-wall hollow chamber wall sections or comprises them, wherein furthermore, additional layers can be present on the inside and on the outside.

In this regard, the invention can provide that an outer layer is configured as an opaque layer, for example to provide the impression of a wall or to allow preferred cleanability.

It can also be possible that an inner layer is configured as a translucent layer, for example with lighting means arranged behind it.

The invention can also provide that an outer layer is configured as a tear-resistant layer, in particular as a cut-resistant layer, and, in particular, is produced from Kevlar or an alternative high-strength fabric. In this way, damage and/or unauthorized entry can be made more difficult or prevented, if necessary; in other words, a flexible living space extension with increased security can be made available.

It can therefore be provided, within the scope of the invention, that a three-layer or four-layer living space extension is provided, which comprises either an additional layer that is arranged on the inside of the living space expansion or on the outside of the living space expansion, or comprises two additional layers, wherein one additional layer is preferably present on an inside of the living space expansion and a further layer is present on an outside of the living space expansion.

The invention can also provide, in a further development, that pipe runs that can move with the living space expansion, in particular water lines and/or waste water lines, are present.

In this manner, the living space expansion can comprise corresponding sanitary installations, for example a toilet, lavatory sink or kitchen sink, which can be used accordingly when they are moved with the extension, due to the placement of flexible lines.

In this regard, pipe runs can be understood to mean lines. Lines or pipe runs can be present in the form of hoses, for example. It can also be possible that lines or pipe runs configured as hoses or in some other way are present laid in zigzag shape.

BRIEF DESCRIPTION OF THE DRAWINGS

In the following, the invention will be explained in greater detail using drawings. These show.

DESCRIPTION OF THE INVENTION

Figure 1:
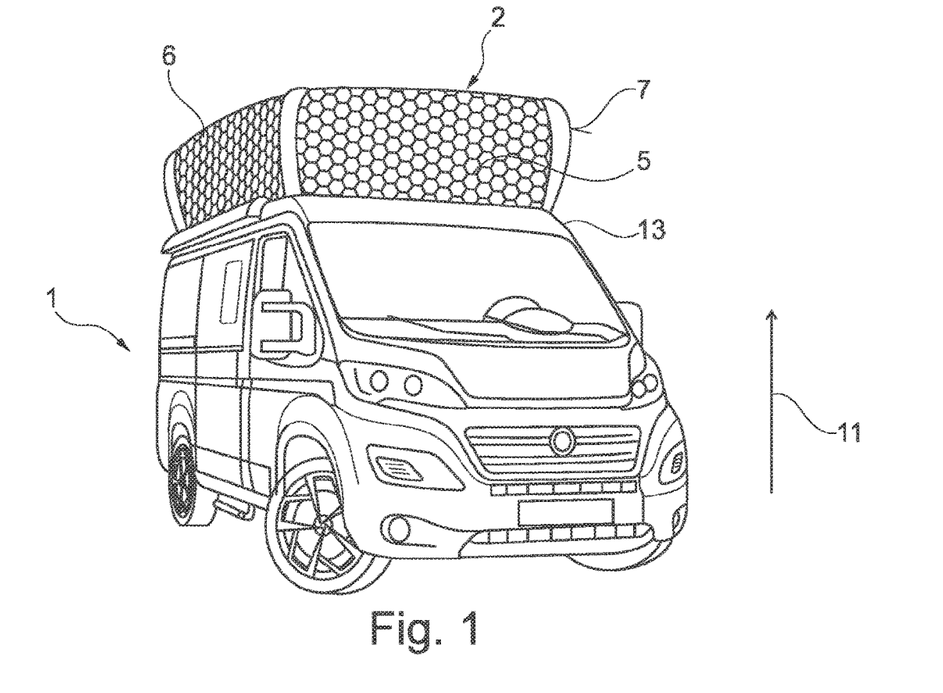
FIG. 1 shows an exemplary embodiment of a vehicle according to the invention in a schematic outside view representation.

In FIG. 1, an exemplary embodiment of a vehicle 1 according to the invention is shown in a schematic outside view representation, wherein a corresponding interior space volume of the vehicle 1 cannot be seen in this figure. The vehicle 1, which is configured as a motor home or camper in the present case, comprises a living space extension 2, which is arranged in the roof region 13 and shown in the set-up state. The living space extension 2 is arranged along a vertical expanse 11 and comprises multiple wall sections, wherein for reasons of the drawing, the wall sections 5 and 6 can be seen.

Figure 2:
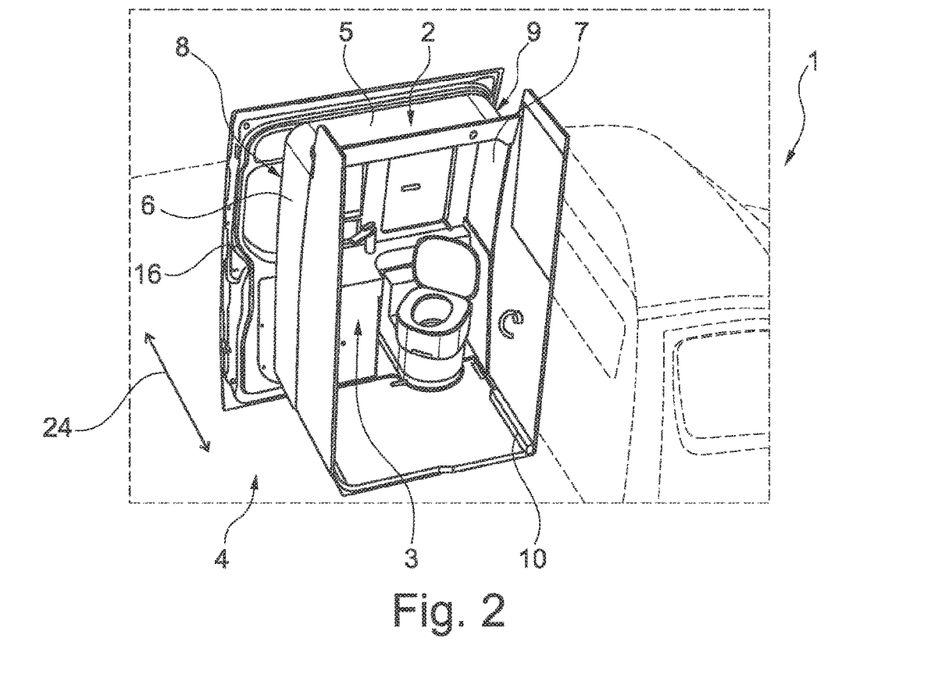
FIG. 2 shows a greatly simplified schematic representation of a vehicle according to the invention in a schematic inside view representation.

In FIG. 2, a vehicle 1, shown schematically, configured as a motor home or camper or the like, can be seen. The vehicle 1 comprises a living space expansion 2, which can be set up as needed, having a space volume 3 that is connected with an interior space volume 4 of the vehicle 1 in the set-up state. The living space expansion 2 comprises three wall sections 5, 6, 7, wherein two wall sections 6, 7 are each configured as side walls 8, 9. The wall sections 5, 6, 7 are configured so that they can be moved out of the interior space volume 4 by means of a movement means 10, to form the living space expansion 2. In the exemplary embodiment shown in FIG. 2, setting up the living space extension takes place in an essentially horizontal expanse 24.

Figure 3:
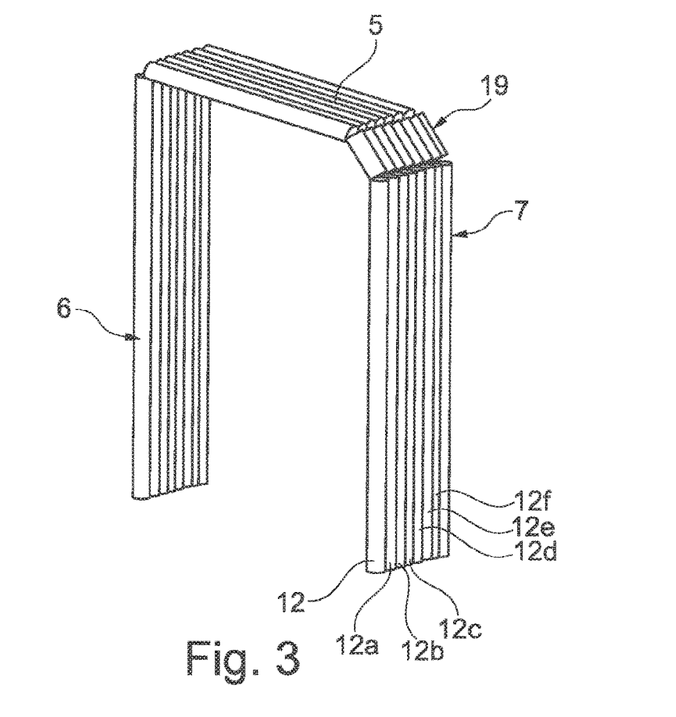
FIG. 3 shows a greatly simplified schematic representation of an embodiment of a part of the living space extension from FIG. 2.
Figure 4:
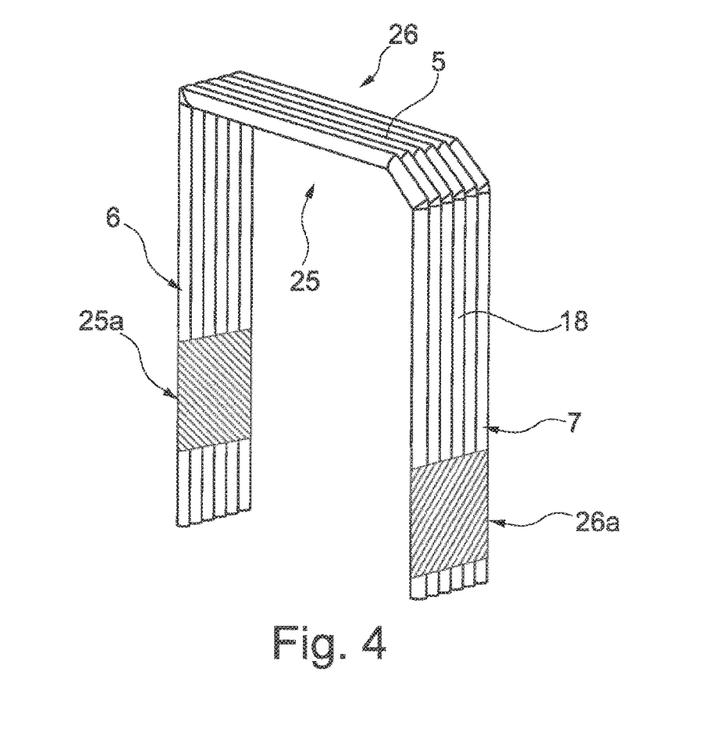
FIG. 4 shows a greatly simplified schematic representation of a further embodiment of a part of the living space extension from FIG. 2.

In the exemplary embodiment shown, all three wall sections 5, 6, 7 are configured as hollow chamber wall sections. In this regard, the wall sections 5, 6, 7 are configured as inflatable hollow chamber wall sections or as self-inflating hollow chamber wall sections. For this purpose, the hollow chamber wall sections comprise essentially multiple chambers, arranged parallel to one another in a vertical expanse and separated from one another, which are shown in FIG. 3. In the exemplary embodiment shown herein, chambers 12, 12a to 12f are included. Furthermore, as shown in FIG. 4, a covering means 18 can be provided, so as to cover or sheathe the chambers 12, 12a to 12f (see FIG. 3). Preferably, the covering means 18 is configured as a one-piece covering means 18. Such a covering means 18 can represent a protective function for protecting the hollow chamber wall sections or the wall sections 5, 6, 7, as well as a corresponding stabilization.

Figure 5:
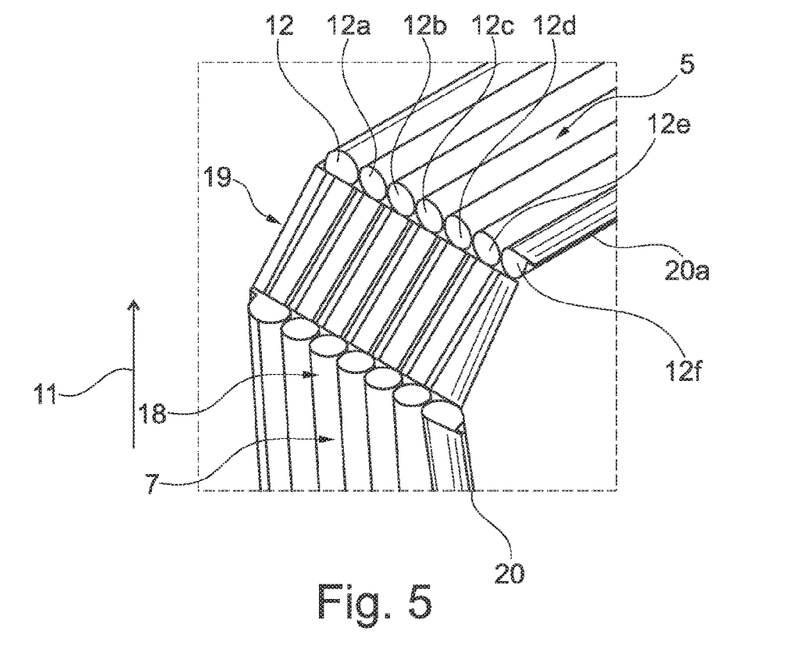
FIG. 5 shows an enlarged view of the part of the living space extension from FIG. 2.
Figure 6:
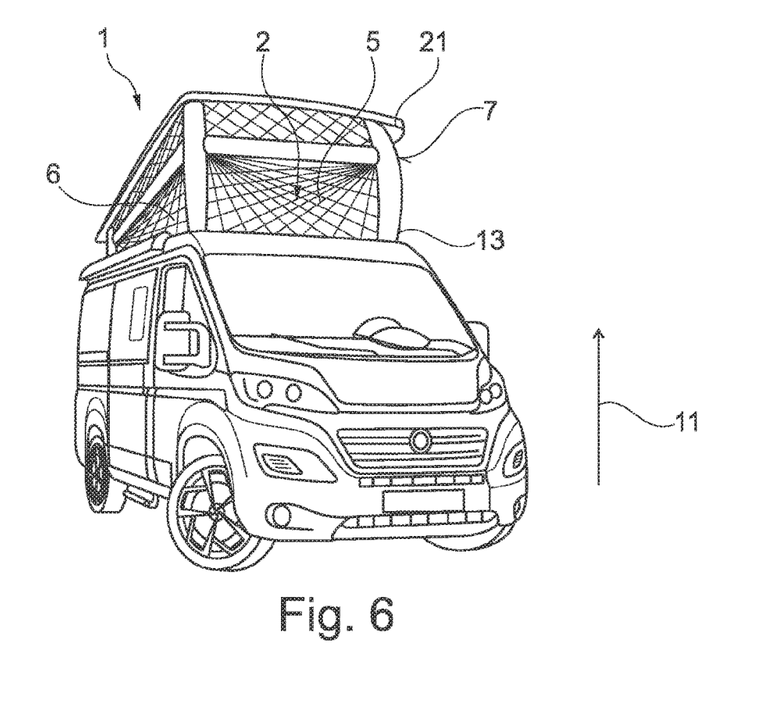
FIG. 6 shows a further exemplary embodiment of a vehicle according to the invention in a schematic outside view representation.
Figure 7:
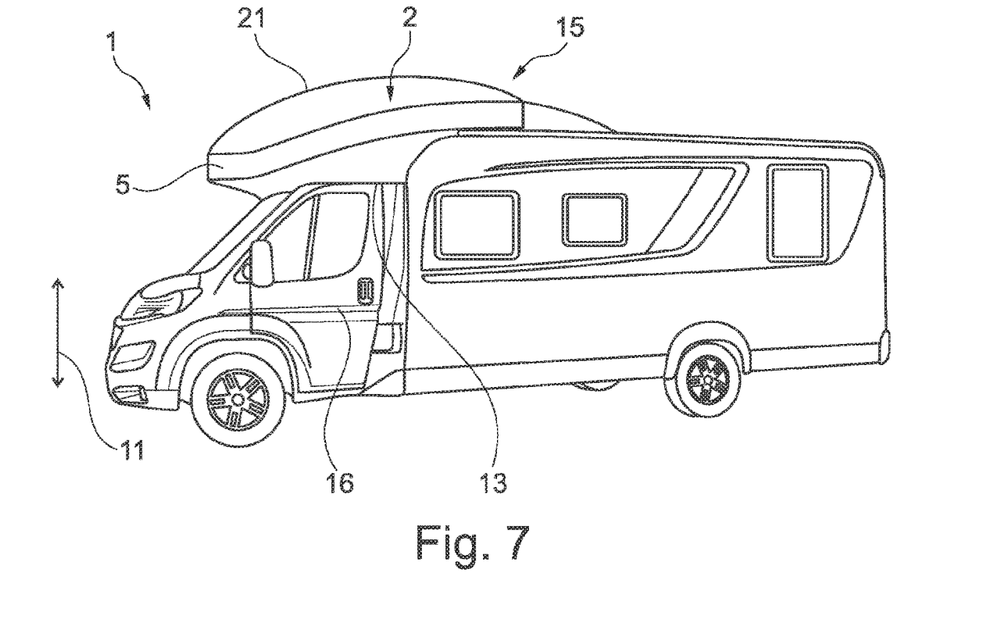
FIG. 7 shows a further exemplary embodiment of a vehicle according to the invention in a schematic outside view representation.
Figure 8:
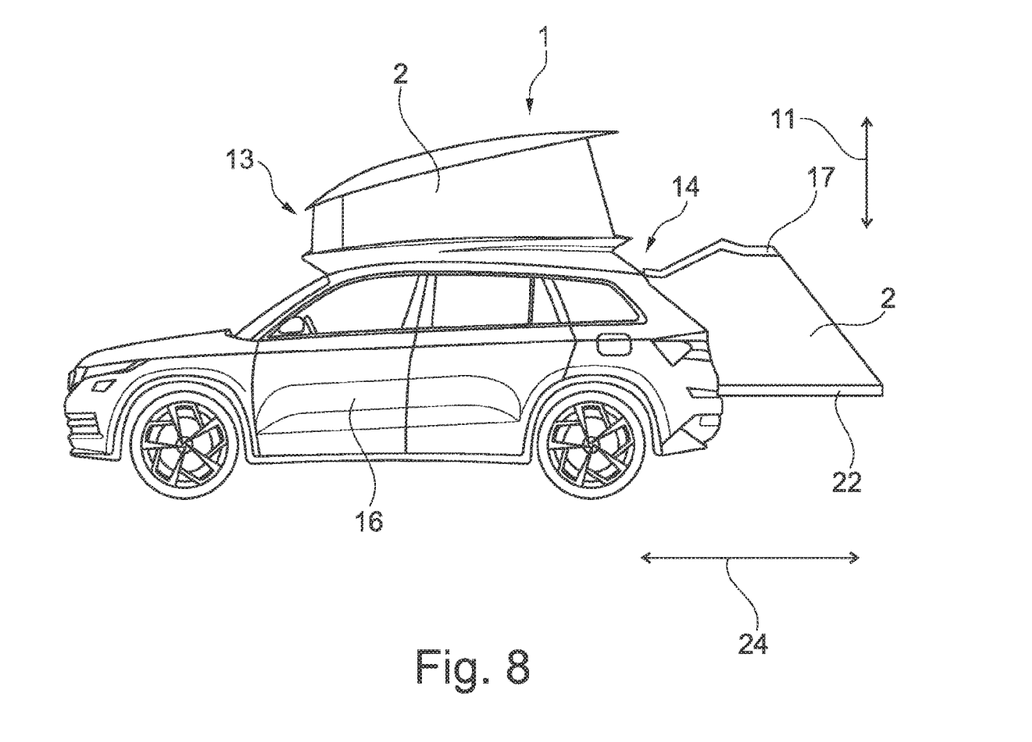
FIG. 8 shows a further exemplary embodiment of a vehicle according to the invention in a schematic outside view representation.
Figure 9:
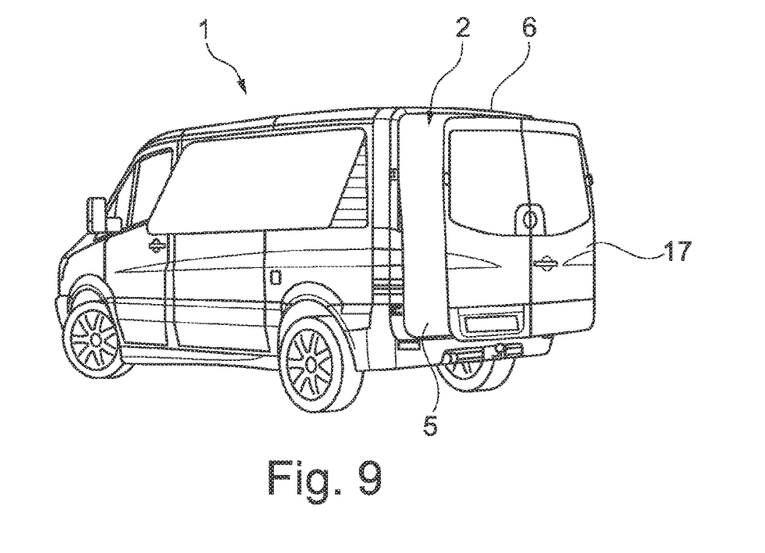
FIG. 9 shows a further exemplary embodiment of a vehicle according to the invention in a schematic outside view representation.

The covering means 18 comprises connecting means 20, 20a (see FIG. 5) in the form of a Keder connection, by means of which the covering means 18 and the vehicle are connected (not shown).

The covering means 18 can be understood to be an additional layer, for example an inner and/or outer layer in the sense of the invention.

A covering means can have the function of a delimitation of the hollow chamber sections (not shown).

It can also be possible that multiple covering means are present (not shown). In this regard, covering means can be configured as an inner layer and/or as an outer layer.

In accordance with the above explanations, it can be provided that the living space expansion comprises at least one double-wall hollow chamber wall section, wherein furthermore, at least one additional layer for delimitation of the hollow chamber wall section is comprised, which is arranged as an inner layer on an inside 25 of the living space expansion and/or as an outer layer on an outside 26 of the living space expansion.

Inside 25 and outside 26 are shown in FIG. 4, for example.

The invention can also be understood in such a manner that a possible inner layer 25a is arranged on the inside 26 (see FIG. 4, section shown with hatched lines) of the living space extension and connected with a hollow chamber wall section (not shown).

Accordingly, a possible outer layer 26a is arranged on the outside 25 (see FIG. 4, section shown with hatched lines) of the living space extension and connected with a hollow chamber wall section (not shown).

In FIG. 3, it can furthermore be seen that a transition region 19 can be configured between wall sections 5, 7 or elsewhere (not shown), wherein the transition region 19 equally comprises hollow chamber wall sections or chambers 12, 12a to 12f. The transition region 19 is arranged at an angle between wall sections 5 and 7 and can, on the one hand, simplify the assembly or disassembly of the living space extension due to increased flexibility that is created by means of the transition region 19. Furthermore, the transition region 19 can positively influence the stability of the living space extension.

The chambers 12, 12a, 12b, 12c, 12d, 12e, 12f can be configured so as to communicate with one another. It is also possible that the chambers 12, 12a, 12b, 12c, 12d, 12e, 12f are arranged to be isolated from one another. Individual or multiple chambers 12, 12a, 12b, 12c, 12d, 12e, 12f can have at least one opening to allow entry of air, for example (not shown).

An arrangement in which the chambers 12, 12a to 12f are arranged to communicate with one another is implemented, according to FIG. 3, in that openings (not shown) are arranged in the transition region 19.

Further exemplary embodiments of vehicles according to the invention are shown in schematic outside view representations, in each instance, in FIG. 6 to 10.

For example, it can be provided that the living space extension 2 comprises at least one cover 21.

The cover 21, in an alternative designation, can also be interpreted as an additional wall section.

It can be provided that the living space expansion 2 is arranged in a roof region 13 (see FIG. 1 and FIG. 6 as well as FIG. 7) of the vehicle 1 or in a rear region 14 (see FIG. 8) of the vehicle 1. It can also be possible that the living space expansion 2 is configured as an alcove 15 (see FIG. 7).

Furthermore, it can be provided that the living space extension 2 comprises at least one rigid wall section that comprises a side door 16 (see FIG. 2) of the vehicle 1 or a rear hatch 17 (see FIG. 9) of the vehicle 1.

The living space extension can therefore comprise a side door and/or a rear hatch.

It can also be possible that an additional bottom plate 22 (see FIG. 8) is configured, which is comprised by the living space extension 2.

Figure 10:
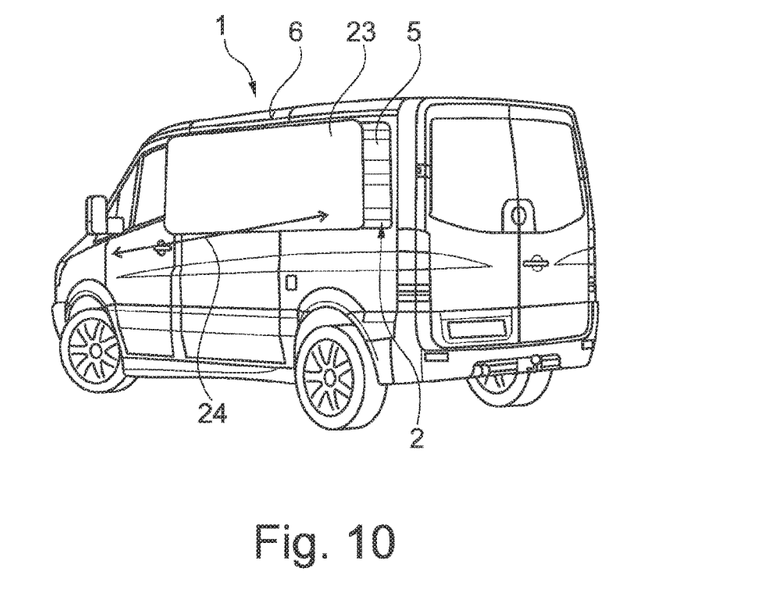
FIG. 10 shows a further exemplary embodiment of a vehicle according to the invention in a schematic outside view representation.

It can furthermore be possible that the living space extension 2 comprises a side window 23 (see FIG. 10).

The invention claimed is:

1. A vehicle comprising a living space expansion that can be set up as needed and has a space volume that is connected with an interior space volume of the vehicle in a set-up state, wherein the living space expansion comprises at least three wall sections, wherein at least two of the at least three wall sections are each configured as side walls, wherein at least one of the at least three wall sections is configured to be moved out of the interior space volume to form the living space expansion, by means of at least one movement means, wherein at least one of the at least three wall sections of the living space expansion is configured as a hollow chamber wall section, wherein the hollow chamber wall section is configured as a supporting structure, and wherein the hollow chamber wall section is an inflatable hollow chamber wall section.

2. The vehicle according to claim 1, wherein at least one side wall is configured as the hollow chamber wall section.

3. The vehicle according to claim 1, wherein all three wall sections of the at least three wall sections are configured as hollow chamber wall sections.

4. The vehicle according to claim 1, wherein at least one hollow chamber wall section comprises chambers that are arranged parallel to one another in a vertical expanse and separated from one another.

5. The vehicle according to claim 4, wherein the chambers comprise between one and ten or between two and eight chambers.

6. The vehicle according to claim 4, wherein at least one chamber is connected with the vehicle, with an adjacent chamber, or both the vehicle and the adjacent chamber by way of a connecting means.

7. The vehicle according to claim 4, wherein the chambers are covered by a covering means, wherein the covering means comprises at least one connecting means by means of which the covering means and the vehicle are connected.

8. The vehicle according to claim 1, wherein the living space expansion comprises at least one additional rigid wall section.

9. The vehicle according to claim 1, wherein at least one hollow chamber wall section is configured in at least multiple layers and comprises at least one layer composed of PVC, TPU, or both PVC and TPU.

10. The vehicle according to claim 1, wherein at least one hollow chamber wall section is produced from a drop-stitch material.

11. The vehicle according to claim 1, wherein the at least one movement means is configured as a motor-driven movement means.

12. The vehicle according to claim 1, wherein the at least one movement means is configured as a hydraulic movement means.

13. The vehicle according to claim 1, wherein the at least one movement means is configured as a mechanical movement means.

14. The vehicle according to claim 1, wherein the living space expansion is arranged in a roof region of the vehicle or in a rear region of the vehicle, or that the living space expansion is configured as an alcove.

15. The vehicle according to claim 1, wherein the hollow chamber wall section comprises a side door or a rear hatch of the vehicle, or the living space expansion comprises at least one rigid wall section that includes the side door or the rear hatch of the vehicle.

16. The vehicle according to claim 1, wherein the living space expansion comprises at least one double-wall hollow chamber wall section and at least one additional layer to delimit the at least one double-wall hollow chamber wall section, which additional layer is arranged as an inner layer on an inside of the living space expansion, as an outer layer on an outside of the living space expansion, or both as the inner layer on the inside of the living space expansion and as the outer layer the outside of the living space expansion.

17. The vehicle according to claim 1, further including pipe runs that can move with the living space expansion.

18. The vehicle according to claim 1, wherein the inflatable hollow chamber wall section is self-inflating.

19. The vehicle according to claim 4, wherein the chambers are air chambers.

20. A vehicle having an interior living space, comprising:
a living space expansion mounted to the vehicle, said living space expansion is movable between a first position, wherein an interior of said interior living space has a first volume, and a second position, wherein the interior of said interior living space has a second volume which is greater than said first volume,
a rigid wall section forming a portion of said living space expansion, said rigid wall section normally being exposed to the exterior of the vehicle, at least in part, regardless of whether said living space expansion is in said first position or in said second position, said rigid wall section being movable across a horizontal expanse as said living space expansion moves between said first position and said second position, and
at least one flexible side wall connected to said rigid wall section and to another portion of the vehicle, and extending along a vertical expanse and able to be expanded across at least a portion of said horizontal expanse, said at least one flexible side wall being exposed to the exterior of the vehicle, at least in part, when said living space expansion is in said second position, wherein said at least one flexible side wall is inflatable to span a distance between said rigid wall section and said another portion of said vehicle when said living space expansion is in said second position, and said at least one flexible side wall includes a plurality of separated air chambers arranged in parallel in said vertical expanse, and wherein the at least one flexible side wall is configured as a supporting structure.

* * * * *